United States Patent Office 3,341,574
Patented Sept. 12, 1967

3,341,574
DI-(NEOPENTYLGLYCOL MONONEOHEP-
TANOATE)AZELATE
Wallace E. Taylor, Hubert H. Thigpen, and Enrique R. Witt, Corpus Christi, Tex., assignors to Celanese Corporation, a corporation of Delaware
No Drawing. Filed Sept. 18, 1964, Ser. No. 397,635
1 Claim. (Cl. 260—485)

This is a continuation-in-part of application Ser. No. 152,013 filed Nov. 13, 1961, and now abandoned.

This invention relates to novel esters and more particularly to novel esters having utility in synthetic lubricant compositions which must withstand elevated temperatures for extended periods of time. This invention also relates to methods of making said esters.

It is known that esters of polyols with alkanoic acids are useful as lubricants and that esters of polyols such as trimethylolpropane, trimethylolethane, and pentaerythritol which have at least two methylol groups bonded to a single quarternary carbon atom are particularly useful for high-temperature stability. However, despite the enhanced thermal stability of such esters, they have not been able to meet the extremely rigorous oxidative stability demands of certain applications such as in the lubrication of high-performance gas turbine aircraft engines.

It is an object of this invention to provide novel esters of exceptional oxidative stability as well as increased thermal stability, for use in high-temperature lubricants.

Other objects and advantages of this invention will become clear from a reading of the specifications in which all proportions are by weight unless otherwise set forth.

In accordance with one aspect of this invention there are provided novel esters of at least one carboxylic acid, having a carboxylic group bonded to a quaternary carbon atom (the α carbon atom), with a polyol having a quaternary carbon atom bonded to two to three methylol groups. The esters of this invention include esters of neoalkanoic acids, that is, alkanoic acids in which the carbon to which the carboxyl group is bonded (the α carbon) has two alkyl groups substituted thereon. A neoalkanoic acid has the general structural formula.

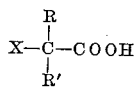

where R, R' and X are alkyl groups with X representing the remainder of the alkanoic acid. R, R' and X may be the same or different alkyl groups, or two of the groups may be the same and the third different. It is necessary that at least a portion of the acidic moieties of the novel esters be provided by neoalkanoic acids and it is preferred that substantially all of the acid moiety is a neoalkanoic acid. Of all the neoalkanoic acids, neoheptanoic acid (2,2-dimethylvaleric acid) is preferred. Other neoalkanoic acids which provide suitable acidic moieties include 2,2-dimethylalkanoic acids having chain lengths from 4 to 13 carbons such as neodecanoic acid, neotridecanoic acid, 2,2,4,4-tetramethyl pentanoic acid, 2-methyl-2-ethyl caproic acid, and neononanoic acid. It is preferred that neo acids are used for esterification of all methylol groups of the alcoholic moiety. However, as can be seen from the above exemplary compounds, other dialpha substiuted acids are operable as are non-alpha substituted acids where mixed esters are formed. It should be further noted that the alpha substitution may in some cases be phenyl groups but such esters are not as desirable as aliphatic alpha-substituted acid esters.

The polyols which provide the alcoholic moiety of the ester according to this invention are polyols having at least two and preferably three methylol groups on a quaternary carbon atom. Among the polyols which can be used are trimethylolpropane, trimethylolethane and other polyols having a quaternary carbon atom. It is desirable to maintain the aliphaticity of these compounds to a minimum in order to obtain best results and to avoid tertiary hydrogen atoms where practical but these are limitations directed toward optimum results.

It is to be noted that the operability of compounds of this invention is not limited by these considerations. Therefore compounds like 2,2,4 - trimethyl 1,3-pentanediol and 2-butyl, 2-ethyl propanediol are operable and included in this invention but are not preferred embodiments thereof.

The novel esters of this invention can be prepared by the direct esterification of the carboxylic acid having an alpha quaternary carbon atom with the polyol having the quaternary carbon atom bonded to two methylol groups. While direct esterification provides the products of this invention, the reactions generally proceed quite slowly. Therefore, if only one acid is being esterified it is preferred to react the above described polyol with the chloride of the above described acid. However, it is preferred to use direct esterification in preparing mixed esters, that is esters of a polyol with more than one carboxylic acid, because direct esterification affords better control of partial esterification with each of the acids. The preparation of these mixed esters will be hereinafter discussed in greater detail.

The chlorides of the carboxylic acids having quaternary alpha carbon atoms can be prepared by any of the conventional methods for preparing carboxylic acid chlorides. The carboxylic acid is conveniently reacted with an equimolecular proportion of either phosphorus pentachloride, or with thionyl chloride, preferably in the presence of a catalyst such as dimethylformamide for example.

It is preferred to use a promotor to aid in the reaction of a carboxylic acid chloride with a polyol according to this invention, though the reaction will proceed without the promoter. Reagents which have been found to be useful in promoting this reaction include tertiary amines such as pyridine, trimethylamine, triethylamine, quinoline, isoquinoline and picolines; Lewis acids such as $MgCl_2$, $ZnCl_2$, and $AlCl_3$; and N,N-disubstituted acid amides such as dimethylformamide and dimethyl acetamide.

Turbine engines are lubricated from a central lubricant supply. The lubricant is fogged into the bearing chamber, in a so-called mist application, to lubricate the ball or roller bearings of the turbine. The lubricant also performs the important function of lubricating and cooling the rotating graphite seals between the turbine blades and the combustion chamber which seals would fail if not cooled and lubricated. After lubricating the roller or ball bearings, the lubricant is collected in sumps from which it is pumped back to the lubricant supply. The lubricant is de-gassed before being recirculated by centrifuging to remove any gas or volatiles (cracked lubricant molecules primarily) which have been introduced into the system. This same lubricant is also used to lubricate the drive gears for auxiliary power chains driven by the turbine. In the case of jet engines, these auxiliary drive chains can operate air-conditioning units, guidance systems, weapons systems, and the like. The lubricant is operable in the mesh of the gears and therefor must withstand extremely high pressures.

It is also very important that the lubricant must be temperature- and oxidative-stable in order to withstand the conditions encountered in turbine lubrication applications.

In accordance with a more specific aspect of this invention, it has been found that the novel ester trimethylolpropane trineoheptanoate is an excellent compound for use in synthetic high-temperature lubricant compositions.

For example, when compared to trimethylolpropane triheptanoate, it has been found that trimethylolpropane trineoheptanoate displays a greatly increased resistance to oxidation and undergoes thermal degradation at a temperature about 100° F. higher than does trimethylolpropane triheptanoate. In order to compare the oxidation resistance of trimethylolpropane trineoheptanoate to that of trimethylolpropane triheptanoate, each ester was maintained at 347° F. for 3 hours and then tested for the rate of oxygen absorption. The data obtained from this test appears in Table I, below, along with the temperatures at which the respective esters display thermal degradation.

TABLE I

| Ester | Temp. at which ester Undergoes Thermal Deg., ° F. | O₂ Absorption Rate After 3 Hours at 347 in cc. of O₂ per minute |
| --- | --- | --- |
| Trimethylolpropane trineoheptanoate | 700 | 0.2 |
| Trimethylolpropane triheptanoate | 600 | 3.8 |

The reaction between the acid chloride and the polyol is suitably carried out at a temperature in the range of from about 0 to 200° C. and preferably from 0 to 100° C. The acid chloride is preferably added gradually to the polyol, conveniently at atmospheric pressure in order to be able to exercise better control over the reaction and keep it from getting out of hand. After the acid chloride is added, the reaction is permitted to reflux to completion. The ester product is then separated, suitably by distillation or other known purification methods.

Trimethylolpropane trineoheptanoate, for example, is purified by removing all volatiles which come off below 230° C. pot temperature and 223° C. vapor temperature under a pressure of 2 mm. Hg absolute and then removing the ester from the residue by distillation at from 230° to 240° C. vapor temperature under a pressure of 2 mm. Hg absolute.

The proportions of the reactants will of course vary with the nature of the polyol, the number of methylol groups said polyol contains, and the extent of esterification desired. For example, in the preparation of trimethylolpropane trineoheptanoate, from about 3 to 3.5 moles and preferably from 3.05 to 3.3 moles of neoheptanoic acid chloride are reacted with one mole of trimethylolpropane. Where a promoter is used, it preferably constitutes from 0.01 to 0.5% of the total reaction mixture.

As stated above, mixed esters are preferably produced by reacting a polyol and a plurality of acids by direct esterification of the polyol with the appropriate carboxylic acids. Although the direct esterification reaction is considerably slower than the acid chloride reaction, it is preferred since greater control can be exercised over the reaction. For example, trimethylolpropane can be directly esterified with neoheptanoic acid by refluxing the polyol and the carboxylic acid at a temperature preferably from about 80 to 300° C. conveniently at atmospheric pressure using as a catalyst p-toluene sulfonic acid. An azeotroping agent, such as xylene for example, is conveniently used to remove water from the reaction mixture. The degree of esterification of the polyol can be determined by varying the reaction time thereby forming predominantly "mono" or "di" partial ester. The partial ester can subsequently be further esterified with a different carboxylic acid to produce a mixed ester. The second acid is preferably of the neoalkanoic type although this is not a critical requirement. Similarly, each of the hydroxyl groups of trialkylol alkanes can suitably be esterified with a different acid or two can be esterified with the same acid and a different acid employed for the third hydroxyl esterification.

The following examples will further illustrate the practice of this invention:

Example I

Neoheptanoyl chloride is prepared by reacting equimolar proportions of neoheptanoic acid with phosphorus pentachloride. Then to 88 parts by weight (0.66 mole) of trimethoylolpropane there is slowly added 321 parts by weight (2.2 moles) of the neoheptanoyl chloride over a period of 60 minutes while the mixture is maintained at 60° C. The mixture is then refluxed at 120° C. for four hours, after which the product is vacuum-stripped free of all volatiles coming off up to 230° C. pot temperature and 223° C. vapor temperature at 2 mm. Hg absolute. The ester product is then removed by distilling the residue from 230° to 244° C. pot temperature and 223° to 240° C. vapor temperature at a pressure of 2 mm. Hg absolute to produce 261 parts by weight of crude ester product. The product is diluted with an equal volume of toluene and washed five times with dilute caustic. Then the product was water-washed to neutrality. The washed ester was then dehydrated, treated with charcoal, and filtered to give 208 parts by weight of finished material.

Example II

Trimethylolpropane trineodecanoate was prepared by dissolving 67 parts by weight (0.5 mole) of redistilled trimethylolpropane and 4.7 parts by weight of dimethyl formamide in 86.5 parts by weight of toluene; heating the solution to 70° C.; adding 310 parts by weight (1.66 moles) of neodecanoyl chloride; heating the solution to 95° C. for 2 hours; cooling to room temperature; and then adding 49 parts by weight of pyridine. After permitting the reaction mixture to stand overnight, it was washed with hydrochloric acid, caustic and water; the solvent was evaporated, under vacuum; the product was decolorized with charcoal; and then filtered to give 240 parts by weight of product. The yield was 82% based upon the weight of trimethylolpropane charged.

Example III

Trimethylolpropane dipivalate was prepared by dissolving 94 parts by weight (0.7 mole) of trimethylolpropane, 216 parts by weight (2.16 moles) of pivalic acid and 1.5 parts by weight of p-toluene sulfonic acid monohydrate in 500 parts by weight of toluene; refluxing the reactants and azeotropically removing esterification product and water; water washing; and removing the solvent by vacuum distillation to give 175 parts by weight of the ester product which was a colorless, clear oil with a boiling point of 154 to 157° C. at a pressure of 0.2 mm. Hg absolute.

Example IV

Trimethylolpropane dipivalate heptanoate was prepared by dissolving 110 parts by weight (0.36 mole) of trimethylolpropane dipivalate (see Example III) and 4.7 parts by weight of dimethylformamide in 400 parts by weight of toluene; heating the solution to 20° C.; adding 90 parts by weight (0.61 mole) of heptanoyl chloride to the solution over a one hour period; heating to 110° C. for 3 hours; cooling the reaction mixture; and adding 79 parts by weight of pyridine thereto. After standing overnight, the reaction product was washed with hydrochloric acid, caustic and water; the solvent was vacuum stripped out; the product was decolorized with charcoal; and then filtered to give 151 parts by weight of product. The yield was 98%.

Example V

Neopentyl glycol (NPG), 1650 parts by weight (15.9 moles), 1.5 liters of xylene, and 40 parts by weight of p-toluenesulfonic acid were placed in a five-liter, three-neck flask fitted with stirrer, 18 inch section of one-inch Vigreux column, reflux condenser and Dean-Stark trap.

Neoheptanoic acid, 1030 parts by weight (7.92 moles), was added to the flask in 100 parts by weight portions at 30 minute intervals while the reaction mixture was being refluxed. Following complete addition of the neoheptanoic acid and after water ceased to be collected in the trap, the mixture was distilled. Obtained was 980 parts by weight (58% yield) of product boiling at 104° C. at 2.5 mm. Hg A.

*Example VI*

Neopentylglycol mononeoheptanoate, 525 parts by weight (2.43 moles), was dissolved in one kg. of toluene and heated with stirring to 60° C. Azelaoyl chloride, 250 parts by weight (1.11 moles), was added slowly over a period of one hour and the reaction proceeded smoothly at 75° to 80° C. Product was then refluxed for two hours, cooled and washed once with one liter of dilute hydrochloric acid, four times with one liter of dilute sodium hydroxide, and five times with one liter of water. Solvent and volatile materials (NPG mononeoheptanoate) were removed in vacuo and the product was treated with decolorizing carbon and vacuum filtered to give 548 parts by weight (91% yield) of colorless oil.

The term "parts by weight" refers to grams.

It is to be understood that the foregoing detailed description is given merely by way of illustration and that many variations may be made therein without departing from the spirit of our invention.

The embodiments of the invention in which an exclusive property or privilege is claimed are defined as follows:

Di-(neopentylglycol mononeoheptanoate)azelate.

References Cited

UNITED STATES PATENTS

| | | | |
|---|---|---|---|
| 2,588,194 | 3/1952 | Arundale et al. | 260—485 |
| 2,975,152 | 3/1961 | Hurwitz | 260—488 |
| 3,049,557 | 8/1962 | Emrick | 260—497 |
| 3,155,519 | 12/1963 | Crouse et al. | 260—488 |

FOREIGN PATENTS 854,963  11/1960  Great Britain.

OTHER REFERENCES

Migridichian: Organic Synthesis, vol. I, Reinhold Publishing Corp., New York (1957), p. 321.

Wagner and Zook: Synthetic Organic Chemistry, John Wiley & Sons, Inc., New York (1953), pp. 481–482.

RICHARD K. JACKSON, *Primary Examiner.*

LORRAINE A. WEINBERGER, *Examiner.*

I. R. PELLMAN, T. L. GALLOWAY,

*Assistant Examiners.*